Oct. 31, 1961 D. A. AUGUSTIN 3,006,657
HEIGHT CONTROL AND LEVELING VALVE FOR AIR SPRINGS
Filed Dec. 9, 1957 2 Sheets-Sheet 1
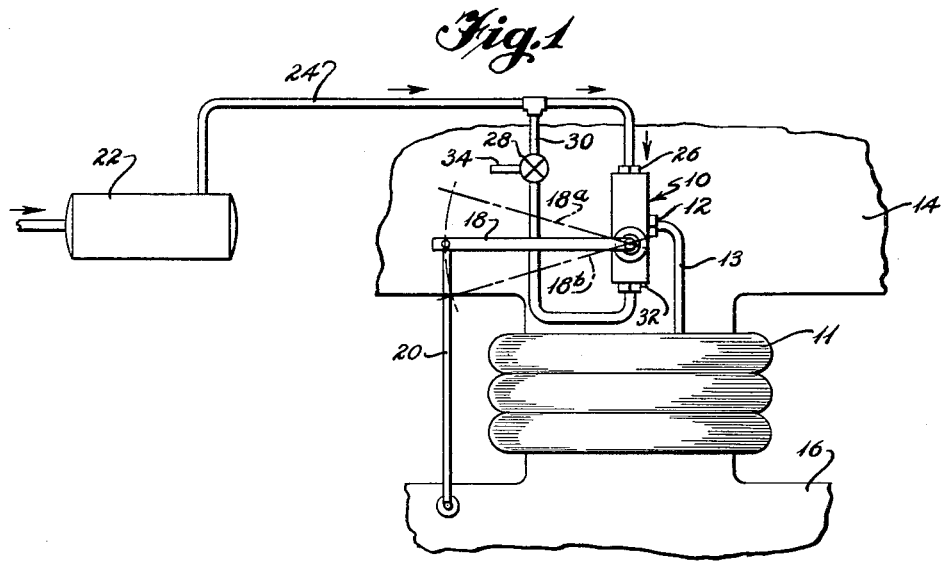
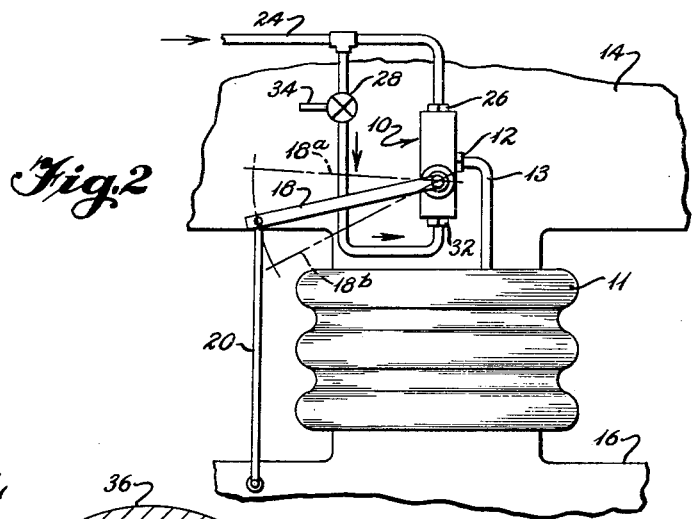
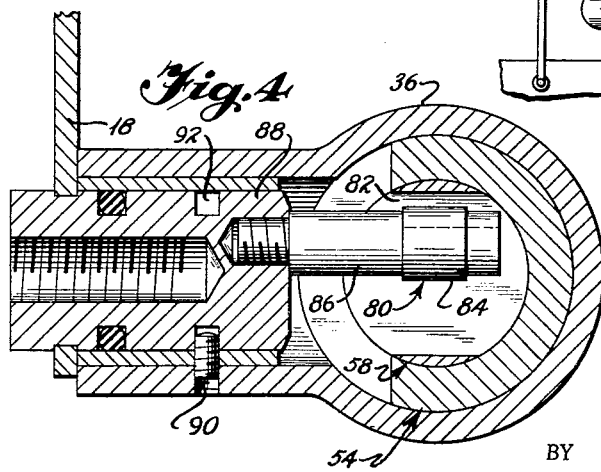
INVENTOR
*Darold A. Augustin*
BY *Scrivener & Parker*
ATTORNEYS

United States Patent Office 3,006,657
Patented Oct. 31, 1961

3,006,657
HEIGHT CONTROL AND LEVELING VALVE
FOR AIR SPRINGS
Darold A. Augustin, Elyria, Ohio, assignor to Bendix-Westinghouse Automotive Air Brake Company, Elyria, Ohio, a corporation of Delaware
Filed Dec. 9, 1957, Ser. No. 701,497
6 Claims. (Cl. 280—124)

This invention relates to motor vehicle air spring suspension systems and more particularly to an improved combined height control and leveling valve mechanism for such systems which enables the height of a vehicle frame above the axle to be established at one or more selected levels and also controls the leveling action of the vehicle frame at the selected level in response to change in load conditions.

Vehicle air spring suspension systems which utilize an air bag or bellows between the vehicle frame and axle have been chiefly concerned with maintaining the vehicle frame at one established level above the axle regardless of vehicle loading. The desirability of being able to raise the frame to a second established level has been recognized in that such action would enable the frame to clear high road crowns and other obstructions without "hanging-up" on the crowns or obstructions as is frequently the case with vehicles using either metallic springs or single-level air springs.

An object of the present invention therefore is to provide in combination with a vehicle air spring suspension system, means for selectively establishing the height of a vehicle frame above the axle at more than one level.

More specifically it is an object of the present invention to provide a control valve for a vehicle air spring suspension system which functions both to establish the desired level of the vehicle frame and also to maintain the established level regardless of changes in vehicle loading.

Another object of the invention is to provide a two level air spring suspension system which utilizes the main bellows or bags themselves under the control of an improved height control and leveling valve to inflate or deflate the air springs to either one or the other established level and thereafter to maintain the vehicle frame at the desired established level regardless of changes in vehicle loading.

Other objects and their attendant advantages will become apparent as the following detailed description is read in conjunction with the accompanying drawings wherein:

FIG. 1 is a diagrammatic view of the control valve mechanism of the present invention associated with an air spring of conventional construction;

FIG. 2 is a view similar to FIG. 1 showing the air spring inflated to its second established level;

FIG. 4 is a horizontal cross sectional view taken substantially along the line 4—4 of FIG. 3.

Figure 3:
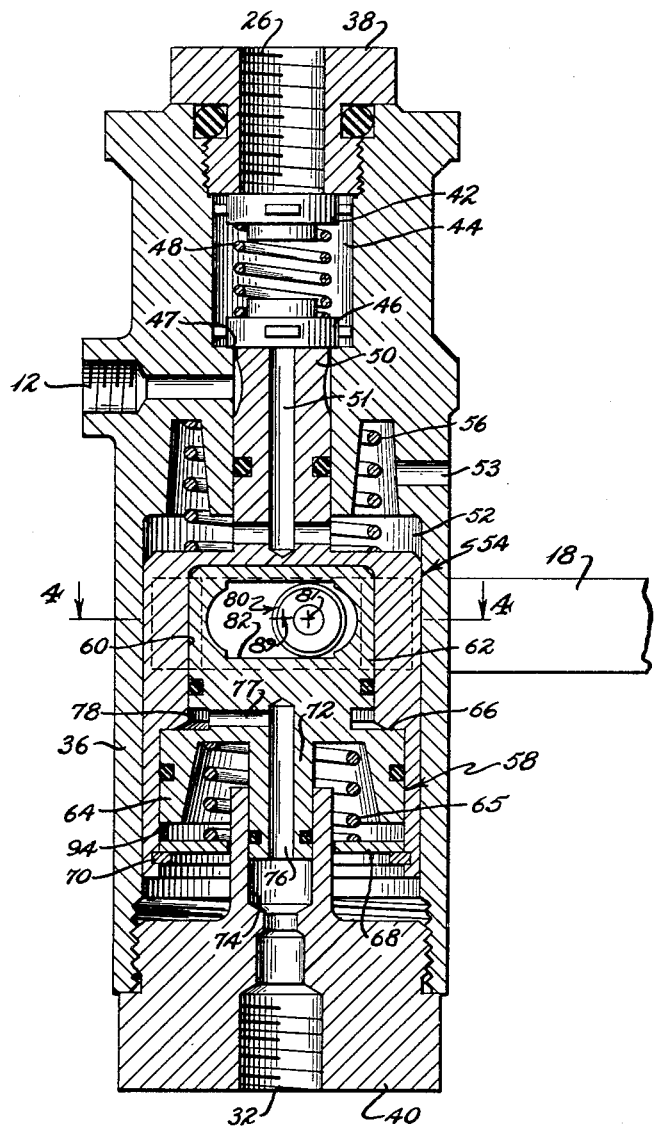
FIG. 3 is a vertical cross sectional view of the control valve of the present invention.

Referring more particularly to FIG. 1, the novel control valve mechanism 10 of the present invention is illustrated therein in association with a conventional air spring or bellows 11 to which the valve is connected by a port 12 and a conduit 13. The valve mechanism 10 is mounted on a portion 14 of the vehicle frame with the air spring being interposed between the frame portion 14 and axle portion 16, operation of the valve being effected by oscillation of a control lever 18, the outer end of which is connected with the axle portion 16 by a link 20. It will be understood that the valve mechanism 10 may be used to control air springs on opposite sides of the vehicle or separate control valve mechanisms may be utilized for each spring if desired.

As will become more fully apparent hereinafter, the valve 10 serves two functions, the first of which is to inflate or deflate the air springs to establish the level of the vehicle frame at one or the other of two selected levels, and the other of which is to maintain the selected level by admitting or exhausting air pressure to or from the air springs in accordance with changes in vehicle loading.

Air is supplied to the air spring for charging the same from a reservoir 22 which is connected by a conduit 24 to a port 26 at the upper end of the valve mechanism 10. In the normal level position of the air spring, as illustrated in FIG. 1, air is admitted to or exhausted from the spring 11 by means of a combined inlet and exhaust valve in the valve mechanism and later described in detail, which is controlled by the oscillation of the lever 18 on one side or the other of its full line neutral position in FIG. 1. The limits of lever oscillation are indicated in FIGS. 1 and 2 by the dotted lines 18a and 18b and when the lever is moved in the direction of line 18a upon increased vehicle load, the valve mechanism is operated to admit pressure to the spring to raise the frame to the point where the lever is again in its neutral position. When the vehicle load is decreased the air spring 11 expands to lower lever 18 which then operates the valve mechanism to connect the spring to atmosphere and thus deflate the spring until the lever again returns to its neutral position.

In the high level position of the spring in FIG. 2, the lever 18 functions exactly as described in the foregoing paragraph except that now in its neutral position the lever is inclined with respect to the horizontal since the frame 14 and the valve mechanism have been elevated to the higher established level whereas the lever 18 and linkage 20 connecting the lever end to the axle have remained unchanged in length. Air pressure for inflating the spring to the second established high level is controlled by a three-way valve 28 in a branch conduit 30 which serves to connect the conduit 24 with a port 32 at the lower end of the mechanism 10. When the valve 28 is in one position, it disconnects the supply conduit 24 from port 32 and connects the latter to atmosphere through an exhaust port 34 in the valve 28 thereby exhausting control pressure from the mechanism 10 so that only sufficient pressure is admitted to the air spring to inflate it to its first normal position of FIG. 1. However, when the valve 28 is moved to its second position, it disconnects port 32 from atmosphere while connecting the latter to supply conduit 24 thus admitting control pressure to mechanism 10 where, as will be later described in detail, the control pressure causes the aforementioned combined inlet and exhaust valve to be moved independently of lever 18 so as to admit pressure from reservoir 22 to air spring 11 to inflate the same, and raise the frame to its second high level at which point the combined inlet and exhaust valve is moved into a lapped position to be thereafter operated by the lever 18 exactly as it had been when the spring was in the normal position of FIG. 1.

Referring now to FIG. 3, the valve mechanism of the invention comprises a unitary casing 36 whose upper and lower ends are interiorly threaded to receive respectively cap means 38, 40 each of which is centrally apertured to provide the aforementioned ports 26, 32. The port 26 is connected through a one-way check valve 42 to an inlet cavity 44 containing at its lower end a combined inlet and exhaust valve member 46 which is urged toward its seated position on valve seat 47 by a spring 48 which also bears on the check valve 42 to urge this valve to its normal seated position.

The valve 46 is moved to unseated position away from seat 47 by the upward movement of a plunger 50 which contains a centrally drilled passageway 51 connected to an exhaust cavity 52 in casing 36 which in turn is connected to atmosphere through an exhaust port 53.

When the plunger moves upwardly to unseat valve 46, the air spring which is connected to port 12, is connected by a slight clearance around plunger 50, with the inlet pressure in cavity 44. When plunger 50 moves downwardly below seat 47, the valve 46 seats thereon to disconnect inlet pressure from port 12 while simultaneously the upper end of exhaust passage 51 is pulled away from valve 46 thus connecting the air spring with atmosphere through port 12, exhaust passage 51, exhaust cavity 52 and port 53. However, when the plunger moves upwardly or downwardly, as the case may be, to the point where it remains in contact with the valve 46, to effect a seal against exhausting pressure from the springs, and causes the valve 46 simultaneously to seal on its seat 47 to prevent supplying additional pressure to the springs the valve has assumed its level, neutral, or lapped position.

The plunger 50 is carried atop a cupped piston member 54 which is normally urged by a spring 56, disposed in the exhaust cavity 52, into engagement with a cam actuated piston 58 received in a cavity 60 of the cupped piston 54. The piston 58 is stepped to provide an upper portion 62 and a lower portion 64 of greater diameter whose upper annular edge is normally maintained by a spring 65 in abutting relationship with a shoulder 66 of piston 54. The upper end of spring 65 acts on the under side of piston 58 and the lower end of the spring bears on a washer 68 which is supported on an expansion ring 70 carried in a groove in the skirt of the cupped piston 54. The piston 58 is provided with a downwardly extending plunger portion 72 which is slidingly received in a counterbore 74 in cap member 40 and is drilled to provide a passage 76 whose upper end is connected by a horizontal passage 77 with an annular groove 78 in the upper portion 62 of piston 58 adjacent the shoulder 66 of cupped piston 54. From the foregoing it will be seen that when control pressure is admitted to port 32 it flows to groove 78 to exert a force on shoulder 66 tending to move pistons 54 and 58 in opposite directions but, as will become more fully apparent, the piston 58 is restrained from downward movement so that control pressure can only move piston 54 upwardly to unseat valve 46 and thus admit pressure from cavity 44 past plunger 50 to the air spring 11 via the port 12.

The piston 58 is moved relative to casing 36 only by the action of a cam 80 which operates in a horizontal slot 82 in piston 58 and is connected to lever 18 as shown in FIG. 4. As seen there, the cam 80 comprises a roller 84 carried on a spindle 86 eccentrically secured in the end of a bearing member 88 whose outer end is suitably connected to the lever 18. The bearing member 88 is mounted against endwise movement by means of a set screw 90 through casing 36 which is received in an annular groove 92 in the bearing member 88.

In operation with the parts of the valve mechanism in the position shown in FIG. 3, which is the position they would assume when the air spring is in its first lower or normal level of FIG. 1, when the loading of the vehicle is increased the entire valve mechanism moves downwardly causing lever 18 to move counterclockwise in FIG. 3 thus causing cam 80 to move piston 58 and with it piston 54 and plunger 50 upwardly to unseat combined inlet and exhaust valve 46 thereby connecting inlet cavity 44 with port 12 to admit air pressure to spring 11. Should the load in the vehicle have been decreased, the vehicle frame would then move upwardly causing lever 18 to rotate clockwise in FIG. 3 so that piston 58 would be moved downwardly by cam 80. As piston 58 moves downwardly the spring 56 acting on piston 54 causes this to follow piston 58 so that plunger 50 is withdrawn from valve 46 to connect the port 12 to atmosphere through the passage 51, exhaust chamber 52 and the exhaust port 53 in the side of the casing 36. As the pressure in spring 11 is either increased or relieved the frame 14 elevates or descends until the lever 18 is again in its neutral position at which point the valve 46 engages seat 47 and the upper end of passage 51 is sealed off so that the valve mechanism is lapped and no further air pressure can be admitted to or exhausted from the air spring until there is a further change in loading.

From the foregoing it will be observed that when the parts of the valve mechanism are in the position shown in FIGS. 1 and 3 the mechanism operates similarly to a conventional air spring control valve which is responsive to vehicle loading to seat or unseat from an inlet or an exhaust passage, a combined inlet and exhaust valve, either to exhaust air from the air spring or to admit pressure to the spring in accordance with whether vehicle loading is decreased or increased thereby maintaining the vehicle frame at a preselected or established level.

When leveling action is desired at the normal level of FIG. 1 the three-way valve 28 is positioned to connect the control port 32 to atmosphere as explained above. However, should it be desired to move the entire frame upwardly to its second or high position, the vehicle operator turns the valve 28 to shut off the exhaust 34 and connect the control port 32 to reservoir pressure. Upon this occurrence fluid pressure flows through port 32 and passages 76 and 77 to annular groove 78 and there exerts a parting force on the shoulder 66 of cupped piston 54. Since piston 58 contains the cam 80 it cannot be moved by fluid pressure so that only piston 54 is moved upwardly independently of piston 58 by the pressure in groove 78. When the washer 68 at the lower end of piston 54 engages the lower edge 94 of piston 58, the piston 54 can be moved no further by air pressure in the groove 78. The extent of independent upward movement of piston 54 is determined by the spacing between the washer 68 and the lower edge 94 of piston 58 and those skilled in the art will recognize that this extent of movement can be readily varied by the addition of suitable shims below the washer in a manner well known in the art. As the piston 54 is moved upwardly by the control pressure in groove 78, the plunger 50 is moved against the valve 46 to unseat this independently of any action by lever 18. The valve 46 is opened only to the extent permitted by the aforesaid spacing between washer 68 and the edge 94 and when the valve is so opened it connects the air spring 11 with the pressure in inlet cavity 44 by way of port 12. Air pressure is thus allowed to inflate spring 11 and as this occurs the vehicle frame 14 and the valve mechanism 10 carried thereby are raised to rotate lever 18 clockwise in FIG. 3 causing cam 80 to move piston 58 and hence piston 54, which is in engagement with the lower edge 94 of piston 58, downwardly relative to casing 36 so that valve 46 eventually seats on seat 47 blocking further flow of pressure to spring 11, thus lapping valve 46. The relative downward movement of the cam with respect to the casing is achieved through the inclination imparted to the lever 18 as the frame 14 rises. Of course, the entire valve must rise relative to the axle but since the axis of the cam shown at 81 in FIG. 3 is intermediate the ends of lever 18, it will be apparent that as the latter is rotated about its substantially fixed pivotal connection with link 20, the extreme opposite end of the lever whose center of oscillation is indicated at 89 in FIG. 3 will rise vertically upwardly a greater distance than any point on the lever closer to the aforesaid fixed pivot. Thus the cam axis 81, being further down the slope of the lever toward the fixed pivot, it and hence plunger 50 cannot possibly rise vertically the same distance as the center of oscillation 89 of the lever's extreme end and thus a point of lever inclination is reached where the cam and plunger move relatively vertically downwardly with respect to the rising extreme end of lever 18 and this relative downward movement continues until the valve 46 engages seat 47 and is lapped so that air is neither exhausted from nor admitted to the air spring until such time as the loading in the vehicle changes. Upon this occurrence, the lever is rotated relative to its high lever neutral position of FIG. 2 causing exhaustion or replenishment of spring pressure exactly as has been described for its normal level operation and the valve mechanism of the invention will continue to perform its normal leveling function at the high established level of the frame so long as reservoir pressure is maintained in the annular groove 78. When valve 28 is operated to exhaust control pressure from port 32 and hence groove 78, the springs 56 and 65 acting on piston 54 moves this downwardly relative to piston 58 until the shoulder 66 engages the stepped portion of valve 58. When this happens, the port 12 leading to the air spring is connected to exhaust passage 51 and the air spring thus deflates until valve 46 closes the exhaust passage 51 at which point the valve 46 is again lapped with the spring in its normal position of FIG. 1.

From the foregoing description it will be apparent that the valve of the invention provides an improved control valve for two level operation of air springs by utilizing the conventional air springs without the addition of auxiliary elevating means while at the same time the valve performs its normal leveling function regardless of the selected level. It will also be apparent that the range between low and high levels of operation can be easily controlled by adjustment, through the use of shims and the like, of the clearance between the lower edge 94 of cam operated piston 58 and the upper edge of washer 68 carried by piston 54. Once this adjustment has been made, no further adjustments are necessary since the valve mechanism will invariably inflate the air spring to the set high level whenever control pressure is admitted to annular groove 78 to move piston 54 upwardly and unseat valve 46 as herein described.

It will be apparent that the invention is susceptible of various changes and modifications without, however, departing from the scope and spirit of the appended claims.

What is claimed is:

1. Control valve mechanism for regulating the air pressure within a vehicle air spring for selectively establishing the height of a vehicle frame above an axle at one of two levels and for maintaining the vehicle frame at said selected height, comprising a combined height control and leveling valve having a casing adapted to be mounted on the frame and having an inlet supplied with compressed air and an exhaust port connected to atmosphere, valve means in said casing for controlling the flow of compressed air from said inlet to said air spring or from said air spring to said exhaust port, said casing having a control port adapted to be supplied with compressed air or connected to atmosphere, control means in said casing for operating said valve means including a pressure responsive member movable in opposite directions in response to flow of air pressure to or from said control port, and cam means responsive to the relative movement between the frame and axle and operatively connected with said valve means for operating the latter through said pressure responsive member independently of the position of the latter.

2. Control valve mechanism for regulating the air pressure within a vehicle air spring for selectively establishing the height of a vehicle frame above an axle at one of two levels and for maintaining the vehicle frame at said selected height comprising a combined height control and leveling valve having a casing adapted to be mounted on the frame and having an inlet supplied with compressed air and an exhaust port connected to atmosphere, valve means in said casing movable in opposite directions for controlling the flow of compressed air from said inlet to said air spring or from said air spring to said exhaust port, cam means responsive to relative movement between the frame and axle and operatively connected to said valve means for operating the latter, and control means in said casing adapted to be operatively connected to said valve means for operating the same in said opposite directions independently of said cam means for changing the level of said frame with respect to the axle, and means connecting said cam means and valve means through said control means.

3. Control valve mechanism for regulating the air pressure within a vehicle air spring for selectively establishing the height of a vehicle frame above an axle at one of two levels and for maintaining the vehicle frame at said selected height, comprising a combined height control and leveling valve having a casing adapted to be mounted on the frame, valve means within the casing for controlling the flow of compressed air to or from the air spring, said casing having a control port adapted to be supplied with fluid pressure or connected to atmosphere, pressure responsive height control means in said casing movable in opposite directions in response to the flow of air pressure to or from said control port, a plunger slidable in said casing for operating said valve, said plunger being connected to said height control means for movement thereby, and cam means responsive to relative movement between the frame and axle and operatively connected with said valve means to operate the latter through said pressure responsive height control means and said plunger.

4. Control valve mechanism for regulating the air pressure within a vehicle air spring for selectively establishing the height of a vehicle frame above an axle at one of two levels and for maintaining the vehicle frame at said selected level, comprising a combined height control and leveling valve having a casing adapted to be mounted on the frame, valve means within the casing for controlling the flow of compressed air to or from the air spring, valve actuating means responsive to the relative movement between said frame and axle and operatively connected to said valve means for operating the latter upon occurrence of said relative movement, said valve actuating means including a movable pressure responsive piston and height control means for operating said valve means independently of said relative movement to control the flow of compressed air to or from said air spring for changing the distance between its frame and axle from its first level to its second level, said height control means including said piston, and manually controlled means for supplying compressed air to said piston to move the latter relative to the valve actuating means, said valve actuating means being responsive to the change in said levels to actuate said valve means for maintaining said level when said frame has arrived thereat regardless of subsequent change of loading in said vehicle.

5. The control valve mechanism of claim 4 wherein the pressure responsive piston is provided with a recess and the valve actuating means includes a piston positioned within said recess.

6. The control valve mechanism of claim 5 wherein said pistons are movable relative to each other when compressed air is supplied to the pressure responsive piston.

References Cited in the file of this patent
UNITED STATES PATENTS

| | | |
|---|---|---|
| 2,644,699 | Weiertz | July 7, 1953 |
| 2,881,799 | Menewisch | Apr. 14, 1959 |
| 2,929,620 | Christensen | Mar. 22, 1960 |